US011089859B2

(12) United States Patent
Nordmann et al.

(10) Patent No.: US 11,089,859 B2
(45) Date of Patent: Aug. 17, 2021

(54) HARNESS

(71) Applicant: Andreas Stihl AG & Co. KG, Waiblingen (DE)

(72) Inventors: Alexander Nordmann, Stuttgart (DE); Markus Herrmann, Fellbach (DE); Daniel Wagner, Winterbach (DE); Markus Zeller, Schwaebisch-Gmuend/Herlikhofen (DE); Joachim Kolb, Ludwigsburg (DE); Markus Pfeifer, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 16/571,793

(22) Filed: Sep. 16, 2019

(65) Prior Publication Data

US 2020/0085172 A1 Mar. 19, 2020

(30) Foreign Application Priority Data

Sep. 17, 2018 (EP) ..................................... 18194891
Jul. 1, 2019 (EP) ..................................... 19183590

(51) Int. Cl.
  *A45F 3/14* (2006.01)
  *A45F 3/04* (2006.01)
  (Continued)

(52) U.S. Cl.
  CPC .................. *A45F 3/14* (2013.01); *A45F 3/04* (2013.01); *H01M 50/20* (2021.01);
  (Continued)

(58) Field of Classification Search
  CPC ...... A45F 3/08; A45F 3/04; A45F 3/10; A45F 2003/148; A45F 2003/045; A45F 3/047;
  (Continued)

(56) References Cited

U.S. PATENT DOCUMENTS

| 4,572,414 | A | * | 2/1986 | Blatt | ......................... A45F 3/08 224/262 |
| 4,911,346 | A | * | 3/1990 | Shallman | .................. A45F 3/08 224/153 |

(Continued)

FOREIGN PATENT DOCUMENTS

| DE | 20 2013 011 447 U1 | 3/2014 |
| DE | 20 2012 013 284 U1 | 1/2016 |

(Continued)

OTHER PUBLICATIONS

German-language European Search Report issued in counterpart European Application No. 18194891.0 dated Dec. 21, 2018 with partial English translation (14 pages).

(Continued)

*Primary Examiner* — Brian D Nash
(74) *Attorney, Agent, or Firm* — Crowell & Moring LLP

(57) ABSTRACT

A harness has a support base and a support strap unit for the support base, and a holding device for releasably holding a battery pack in a support position on the support base. The holding device has a docking mechanism on the support base for pivotably docking the battery pack in a docking position, and a securing mechanism for securing the battery pack in the support position pivoted in towards the support base with respect to the docking position. The docking mechanism is arranged on a lower region of the support base, and the securing mechanism has a securing slide which is arranged displaceably on the support base between a release position and a securing position and has a securing hook, or a securing lever which is arranged pivotably on the support base between a release position and a securing position and has a securing bow. The securing hook or securing bow is designed to engage securely behind a (Continued)

corresponding mating securing element of the battery pack in the support position.

31 Claims, 11 Drawing Sheets

(51) Int. Cl.
*H01M 50/20* (2021.01)
*H01M 50/256* (2021.01)

(52) U.S. Cl.
CPC ..... *H01M 50/256* (2021.01); *A45F 2003/045* (2013.01); *A45F 2003/146* (2013.01)

(58) Field of Classification Search
CPC ... A45F 2003/003; A62B 9/04; Y10S 224/907
See application file for complete search history.

(56) References Cited

U.S. PATENT DOCUMENTS

| | | | | |
|---|---|---|---|---|
| 4,934,573 | A * | 6/1990 | Jaeger | A45F 3/08 224/153 |
| 5,480,115 | A * | 1/1996 | Haltof | H01H 9/025 248/221.11 |
| 5,628,443 | A * | 5/1997 | Deutsch | A45C 7/0086 150/113 |
| 5,732,867 | A | 3/1998 | Perkins et al. | |
| 5,954,250 | A | 9/1999 | Hall et al. | |
| 5,991,925 | A * | 11/1999 | Wu | A41D 13/0012 2/102 |
| 6,095,470 | A * | 8/2000 | Kalis | B60R 11/02 248/309.1 |
| 6,857,820 | B2 * | 2/2005 | Jacoway | B63C 11/02 224/627 |
| 7,703,645 | B2 * | 4/2010 | Moskun | A45F 3/08 224/581 |
| 7,778,026 | B2 * | 8/2010 | Mitchell | A45F 3/02 361/679.55 |
| 7,793,809 | B2 * | 9/2010 | Howell | A45F 3/04 224/628 |
| 7,911,779 | B1 * | 3/2011 | Tarnoff | G06F 1/1626 361/679.43 |
| 8,006,877 | B2 * | 8/2011 | Lowry | A45F 3/10 224/633 |
| 8,584,917 | B2 * | 11/2013 | Hexels | A45F 3/10 224/637 |
| 9,220,333 | B2 * | 12/2015 | Losos | A45F 3/10 |
| 9,232,848 | B2 * | 1/2016 | Krikorian | A45F 3/14 |
| 9,350,408 | B2 * | 5/2016 | Cipolla | H04B 1/3827 |
| 9,949,557 | B2 * | 4/2018 | Crimaldi | A45F 3/047 |
| 10,230,077 | B2 * | 3/2019 | Rief | A45F 3/04 |
| 10,299,570 | B2 * | 5/2019 | Kim | A45F 3/04 |
| 2003/0000974 | A1 * | 1/2003 | McUmber | A45F 4/02 224/155 |
| 2012/0286120 | A1 * | 11/2012 | Ziaylek | F17C 13/084 248/312 |
| 2015/0320150 | A1 * | 11/2015 | Beck | A45F 3/06 24/647 |
| 2016/0255942 | A1 | 9/2016 | Wagner et al. | |
| 2016/0260942 | A1 * | 9/2016 | Wagner | H01M 2/20 |
| 2016/0345714 | A1 | 12/2016 | Yamaoka et al. | |
| 2017/0102735 | A1 * | 4/2017 | Blowers | E05B 73/0082 |
| 2018/0008031 | A1 * | 1/2018 | Johnsson | A45F 3/14 |
| 2018/0042365 | A1 * | 2/2018 | Riehmann | A45F 3/047 |
| 2018/0092455 | A1 * | 4/2018 | Kim | A45F 3/04 |
| 2018/0303227 | A1 * | 10/2018 | Simione | A45F 3/08 |
| 2019/0110650 | A1 * | 4/2019 | Mobarak | A47L 5/225 |
| 2019/0125062 | A1 * | 5/2019 | Kippen | A45F 3/10 |
| 2019/0313775 | A1 * | 10/2019 | Tamagnini | A45F 3/08 |
| 2020/0085173 | A1 * | 3/2020 | Nordmann | B25F 5/02 |

FOREIGN PATENT DOCUMENTS

| | | |
|---|---|---|
| DE | 10 2015 002 724 A1 | 9/2016 |
| EP | 0 887 005 A1 | 12/1998 |
| EP | 2 819 207 A1 | 12/2014 |
| EP | 3 106 565 A2 | 12/2016 |
| WO | WO 2009/157881 A1 | 12/2009 |
| WO | WO 2018/007111 A1 | 1/2018 |

OTHER PUBLICATIONS

English translation of document B2 (DE 20 2012 013 284 U1 previously filed on Sep. 16, 2019) (48 pages).
English translation of document B3 (DE 20 2013 011 447 U1 previously filed on Sep. 16, 2019) (20 pages).
English translation of document B4 (EP 2 819 207 A1 previously filed on Sep. 16, 2019) (14 pages).

* cited by examiner

HARNESS

CROSS REFERENCE TO RELATED APPLICATION

This application contains subject matter related to U.S. application Ser. No. 16/571,867, entitled "Harness" filed on even date herewith.

BACKGROUND AND SUMMARY OF THE INVENTION

The invention relates to a harness which comprises a support base, a support strap unit for the support base, and a holding device for releasably holding an object in a support position on the support base, wherein the holding device comprises a docking mechanism on the support base for pivotably docking an object in a docking position, and a securing mechanism on the support base for securing the battery pack in the support position pivoted in towards the support base with respect to the docking position, and it relates to a tool kit having such a harness.

The support base serves to receive the object that is to be carried, e.g. by securing the object on the support base or by introducing the object into a receiving space of the support base. The support strap unit serves to allow a user to wear the support base, with the object located on or in the latter, on his back. The object may e.g. be a battery pack.

The harness can be designed in particular to carry a battery pack, in particular a battery pack that can be worn on the back and that supplies electrical energy to hand-held electrical tools, in particular electrically powered gardening and/or forestry tools. In the present case, hand-held electrical tools are to be understood especially as electrical tools that are carried by hand or guided along the ground, in particular those used for gardening and/or forestry work, such as power saws, hedge shears, leaf blowers, sweepers, lawnmowers and scarifiers, to give just a few examples. The battery pack is designed to be worn on the user's back by means of the harness system and supplies the electrical energy that the electrical tool requires during use, for which purpose it has suitable storage battery cells, which are to be understood here as any desired conventional accumulator or battery cells. Typically, the storage battery cells are arranged to form an accumulator cell block.

When used for carrying a battery pack, the harness has a holding device for releasably holding the battery pack in a support position on the support base. Various securing or holding mechanisms are known for the holding device. In one of these known types, the battery pack is placed in a translational approach movement onto the support base, which can be formed for example by a plate-like support structure, and is then brought into the support position in a displacement movement perpendicular to the approach movement, e.g. from the top downwards. In this context, see for example the laid-open publications US 2016/0345714 A1 and WO 2018/007111 A1, and also the utility model publications DE 20 2012 013 284 U1 and DE 20 2013 011 447 U1. Unless stated otherwise, reference is made here in respect of the location orientation to the orientation of the harness when it is located on a user's back or to the orientation of the battery pack in its support position in the harness located on a user's back. In the alternative type considered here, the holding device has a docking mechanism on the support base for pivotably docking the battery pack in a docking position, and a securing mechanism on the support base for securing the battery pack in the support position pivoted in towards the support base with respect to the docking position.

The laid-open publication EP 2 819 207 A1 discloses a holding device of this kind, wherein the docking mechanism is formed there by an upper edge of the support base over which a hook-shaped configuration of an upper edge of the battery pack can be engaged in such a way that a certain pivotability of the battery pack relative to the support base is maintained, with the upper edge of the support base as pivot axis. The function of the securing mechanism is provided by two locking projections which are arranged laterally on the support base, in the lower region thereof, and which interact with corresponding mating locking projections in the lower lateral region of the battery pack so as to form a releasable snap-fit connection, wherein a handle is arranged on the underside of this battery pack, i.e. on it lower side in the support position on a user's back.

The support strap unit of the harness in most cases comprises a shoulder strap unit as a supporting aid for the user. For corresponding uses, it is also expedient if the support strap unit has a waist strap unit. In a typical harness of this kind, the support strap unit additionally has a joint unit, which connects the waist strap unit to the support base in an articulated manner. In the aforementioned utility model publication DE 20 2013 011 447 U1, the joint unit consists of a joint via which a cross-piece is coupled pivotably to the support base about a substantially horizontal pivot axis perpendicular to a plane of the plate-shaped support base, wherein the cross-piece serves to secure a waist strap. In a harness disclosed in the laid-open publication DE 10 2015 002 724 A1, the joint unit consists of a joint which is preferably formed by a fabric/film hinge and by which the waist strap unit is connected pivotably to the support base about a substantially horizontal pivot axis parallel to a plane of the plate-shaped support base. This is intended to facilitate the inward folding of the waist strap unit when setting the harness down and in this way to prevent the waist strap unit from forming an obstacle to the harness being set down in an upright position.

Harnesses of the type mentioned at the outset are also known in which the support strap unit has at least one shoulder strap unit which is releasably connectable to the support base and which can be adjusted to modify the height of the support base. Conventionally in most cases, this is achieved by the fact that a strap web, which can be adjusted in length, is used for a respective shoulder strap of the shoulder strap unit.

It is an object of the invention to provide a harness of the type mentioned at the outset, which is improved in relation to the abovementioned harnesses of the prior art, in particular as regards the way in which an object is secured on the support base, and making available a tool kit equipped with such a harness.

The invention achieves this and other objects by providing a specific harness according to the invention and a specific tool kit according to the invention.

According to the invention, the harness is designed to allow a user to carry on his back an object, such as e.g. a battery pack for supplying electrical energy to hand-held electrical tools, which in particular can be electrically powered gardening and/or forestry tools. For this purpose, the harness comprises a support base, a support strap unit for the support base, and a holding device for releasably holding the object in a support position on the support base, wherein the holding device comprises a docking mechanism on the support base for pivotably docking the object in a docking position, and a securing mechanism on the support base for securing the object in the support position pivoted in towards the support base with respect to the docking position. The docking mechanism is characteristically arranged on a lower region of the support base.

By virtue of these features of the harness, the object can be coupled in a very advantageous manner to the harness. For this purpose, it is docked onto the lower region of the support base, using the docking mechanism, and can then be pivoted in towards the support base in order to reach the support position. If the top of the object is provided with a handle, it can be held by the handle while being docked onto the lower region of the support base and then being pivoted in towards the support base as far as the support position.

The handling of the object, when placing it onto and removing it from the harness, can in this way be restricted to the upper region of the object and of the harness; the user does not necessarily have to manoeuvre the lower region of the object and of the harness. This generally makes handling easier for the user when he wishes to place the object on the harness when the latter is positioned on the ground or on a rest surface. Moreover, after the docking of the object, that side of the support base on which the object is to be placed still remains clearly visible to the user, which makes it easier for him to pivot it into the support position. The docking of the object at the lower region of the support base is also advantageous for reasons of stability, since the tilting moment associated with the docking of the object can be kept low for the harness, in particular much lower than in the case where the object is docked on a central or even an upper region of the support base.

According to one aspect of the invention, the securing mechanism has a securing slide which is arranged displaceably on the support base between a release position and a securing position and has a securing hook, which is designed to engage securely behind a corresponding mating securing element of the object in the support position. This constitutes a structurally simple and functionally advantageous embodiment of the securing mechanism. With the object not docked, the securing slide is located in the securing position, wherein it has a run-on bevel which is designed, by interaction with the mating securing element of the object, to displace the securing slide automatically in the direction of the release position when the object docked on the support base is pivoted inwards in the direction of the support position. By this measure, the securing slide can be moved automatically out of the securing position, by the inward pivoting of the object to its support position, without having to be actuated separately by the user for this purpose. In this case, the securing slide can preferably be pretensioned in the direction of the securing position by a corresponding elastic pretensioning element. During the inward pivoting of the object to its support position, the securing slide is then displaced, counter to the action of the pretensioning element, to the release position, and, as soon as the object has reached its support position, the pretensioning element can automatically return the securing slide to its securing position.

According to an alternative aspect of the invention, the securing mechanism has a securing lever which is arranged pivotably on the support base between a release position and a securing position and has a securing bow, which is designed to engage securely behind a corresponding mating securing element of the object in the support position. This too constitutes a structurally simple and functionally reliable configuration of the securing mechanism, and one that is expedient from the point of view of handling.

In a development of the invention, the docking mechanism provides a pivot axis substantially parallel to an underside of the support base and serving for the pivoting movement of the object to the support position. This contributes further to optimizing the handling of the object when placing it on or removing it from the harness.

In a development of the invention, the securing bow has a run-on face extending in an arc shape with a non-constant spacing from a pivot axis of the securing lever, against which run-on face the mating securing element can be placed with a spacing from the pivot axis that decreases with increasing pivoting of the securing lever in the direction of the securing position. This makes it easier to safely pivot the object into its support position on the support base. In particular, these special kinematics of the securing lever permit an optimal force profile of the inward pivoting force or securing force exerted on the object. In corresponding embodiments, the run-on face preferably extends, at least in an admission region with the decreasing spacing from the pivot axis, along its entire length as far as its end point corresponding to the securing position of the securing lever or alternatively only as far as a point which is spaced apart from the end point and starting from which its spacing from the pivot axis no longer decreases until reaching the end point or at any rate on a part of this remaining length of the run-on face.

In a development of the invention, the securing bow has a run-on face extending in an arc shape with a non-constant spacing from a pivot axis of the securing lever, against which run-on face the mating securing element can be placed with a spacing from the pivot axis, wherein the run-on face extends from a start point as far as an end point corresponding to the securing position of the securing lever, and a spacing of a run-on contact point of the run-on face with the mating securing element decreases with increasing pivoting of the securing lever in the direction of the securing position from the start point until reaching an inflexion point of the run-on face, and the run-on face is designed at the inflexion point to make available a reversal of a torque, which can be exerted on the securing lever by the mating securing element, from a torque acting in the direction of the release position to a torque acting in the direction of the securing position. These special kinematics of the securing lever permit an optimal force profile of the inward pivoting force or securing force exerted on the object, and the special torque reversal on the securing lever at the inflexion point can ensure that, under the effect of a force in the direction of the docking position, the securing lever subjects the object to a torque in the direction of its securing position when it is located directly at the inflexion point on its side directed towards the end point of the run-on face. The latter has the effect that the action of such a force on the object does not lead to further outward pivoting of the object, and instead the securing lever secures the object in that position corresponding to the location of the mating securing element at the inflexion point of the run-on face.

In a development of the invention, the securing lever has an ejector contour which, during the pivoting of the securing lever in the direction of the release position, is designed to exert on the object an ejector force acting in the direction of the docking position. This measure has the advantage that the outward pivoting of the object from its support position to its docking position can be assisted by the pivoting of the securing lever in the direction of the release position, i.e. a pivoting aid is in this way made available to assist the outward pivoting of the object from its support position to its docking position.

In one embodiment of the invention, the ejector contour has an ejection pressure face acting on a mating contact face of the object, on a side of the securing bow directed away from the run-on face, and/or an ejection pressure face acting on the mating securing element of the object, on a side of an ejector cam of the securing lever directed towards the run-on face. Both measures constitute, individually or in combination, advantageous embodiments for allowing the securing lever to exert the ejector force on the object. In the combined embodiment, the two ejection pressure faces can supplement each other, depending on the system configuration, such that they are active in different pivoting ranges of the securing lever or are simultaneously active at least in a partial range of the overall pivoting movement of the securing lever.

In a development of the invention, the securing slide or the securing lever has a user-actuated control element which is located on a side of the support base directed away from an object coupling side of the support base. This facilitates handling by the user when bringing the object from its docking position to its support position. The user can for this purpose control the securing slide or securing lever from that side of the support base that is directed away from the side of the support base for coupling the object. This control actuation is therefore not impeded by the docked object.

In a development of the invention, the holding device has a cushioning spring arrangement which provides the object, in the support position thereof, with elastic cushioning with a resilience acting in the outward pivoting direction. This contributes to safely holding the battery pack free of play in its support position on the support base. Since the resilience of the cushioning spring arrangement acts on the object in the outward pivoting direction away from the support base, the cushioning spring arrangement can avoid undesired sudden impacts of the object against rigid parts of the support base. A barrier to outward pivoting expediently serves to block an outward pivoting of the object as a result of the resilience of the cushioning spring arrangement. This barrier to outward pivoting can be released when the user wishes to detach the object from the support base and for this purpose to pivot it initially from its support position to its docking position. The securing slide or the securing lever preferably functions as such a barrier to outward pivoting, or a separate barrier to outward pivoting can alternatively be provided.

In a development of the invention, the harness comprises a support base and a support strap unit for the support base, wherein the support strap unit has a shoulder strap unit, a waist strap unit and a joint unit which connects the waist strap unit to the support base in an articulated manner. The joint unit comprises a double joint by which the waist strap unit is connected to the support base so as to be pivotable about two pivot axes, wherein one of the two pivot axes runs substantially parallel to a plate plane of the support base, and the other pivot axis runs substantially perpendicularly with respect to the plate plane of the support base.

This constitutes a very advantageous embodiment for articulating the waist strap unit on the support base so as to be pivotable about two axes, without this requiring two individual joint units, and without two such joints being able to interfere with each other. By means of this double joint, the waist strap unit can be pivoted, in each case to the desired extent relative to the support base, about the pivot axis substantially parallel to the plate plane of the support base and also about the pivot axis substantially perpendicular with respect to the plate plane of the support base. Both pivoting mobilities are of advantage for providing corresponding deflection movements of the waist strap unit relative to the support base.

In one embodiment of the invention, the joint unit, and thus also the double joint, is formed by an autonomous component which is fastened on the one hand to the waist strap unit and on the other hand to the support base. Such a joint unit can be produced with a high load-bearing capacity and a long useful life and does not limit the choice of material for the waist strap unit and the support base.

In one embodiment of the invention, one pivot axis runs substantially between and parallel to two mutually facing side edges of the waist strap unit on the one hand and of the support base on the other hand, and the other pivot axis runs, offset with respect to this pivot axis, in the direction away from the waist strap unit. This results in advantageous kinematics for the pivotability of the waist strap unit relative to the support base.

In a development of the invention, the harness comprises a support base and a support strap unit for the support base, wherein the support strap unit has at least one shoulder strap unit, which is releasably connectable to the support base. Characteristically, the shoulder strap unit in this development comprises at least one flexurally stiff strap holder which, by means of a latch mechanism, can be releasably locked at several different heights on the support base, and at least one flexible strap web connected to the strap holder. The flexurally stiff design of the strap holder allows the shoulder strap unit to be bound to the support base in a very stable position. The possibility of being able to releasably lock the strap holder at several different heights on the support base makes available an advantageous height adjustability for the shoulder strap unit. Designing the strap web to be flexible and not flexurally stiff, in contrast to the strap holder, allows comfortable wear of the harness by the user in the conventional manner.

In one embodiment of the invention, the latch mechanism provides several latches for the at least one strap holder at the different heights on the support base, wherein the respective latch comprises a latch release position and, upwardly offset in relation to the latch release position, a latch holding position, between which positions the strap holder is vertically displaceable on the support base. In the latch release position, the strap holder can be attached at the desired height to the support base or removed therefrom. In the latch holding position, the strap holder is connected to the support base in a locked manner, such that it cannot come loose from the support base. To release the strap holder from the support base, the strap holder has to be moved downwards to the latch release position. The upwardly offset arrangement of the latch holding position in relation to the latch release position has the advantage that a weight which acts on the support base in a downward direction cannot cause an inadvertent movement of the strap holder to the latch release position. Instead, this weight of the support base has the effect that the strap holder remains safely in the latch holding position.

In one embodiment of the invention, the latch mechanism has a releasable snap-in lock, which holds the strap holder locked in the respective latch holding position. It is only after this snap-in lock has been released by the user that the strap holder on the support base can be moved downwards to the latch release position and then detached from the support base or placed again at a different height thereon. This constitutes an additional safeguard for the height-adjustable mounting of the support holder on the support base.

In a further aspect, the invention provides for a tool kit which comprises a harness according to the invention and a battery pack that can be worn on the back, can be secured to the harness and supplies electrical energy to hand-held electrical tools, in particular electrically powered gardening and/or forestry tools. The battery pack can in particular be of the kind disclosed in the Applicant's European patent application no. 18194901.7 (having U.S. counterpart application Ser. No. 16/571,994, entitled "Rechargeable Battery Pack", and filed on even date herewith), the entire content of which is expressly incorporated by reference herein.

In one embodiment of the invention, the tool kit additionally comprises a hand-held electrical tool that can be supplied with electrical energy from the battery pack.

Advantageous embodiments of the invention are shown in the drawings. These and further advantageous embodiments of the invention are set out and described in more detail below.

DETAILED DESCRIPTION OF THE DRAWINGS

Figure 1:
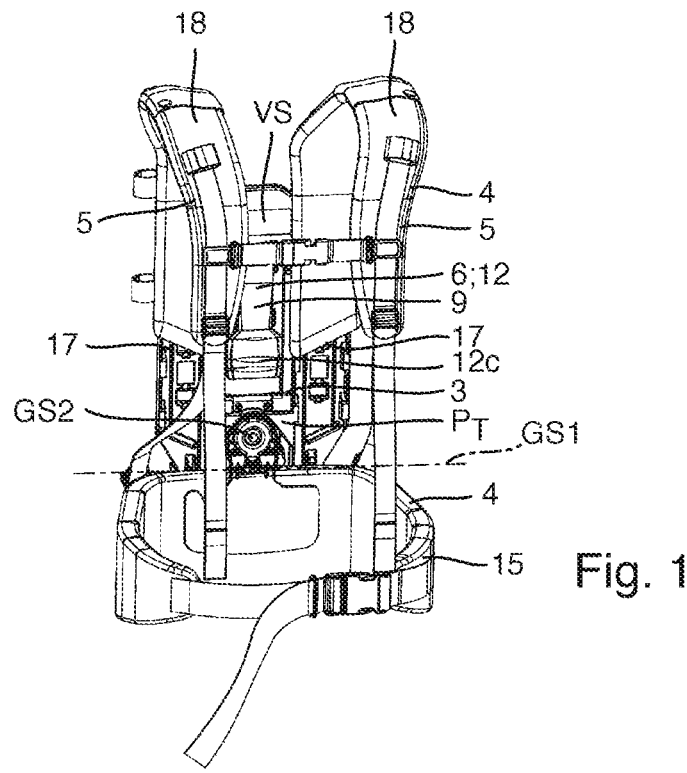
FIG. 1 shows a perspective front view of a harness.
Figure 2:
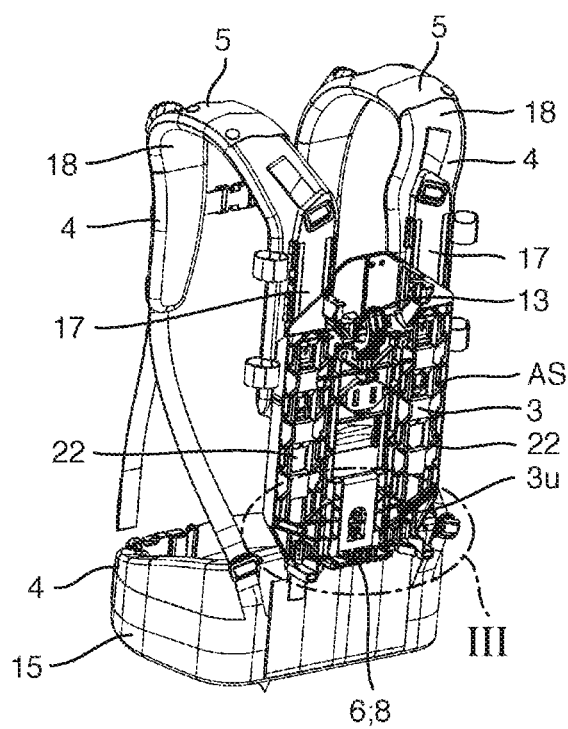
FIG. 2 shows a perspective rear view of the harness.
Figure 3:
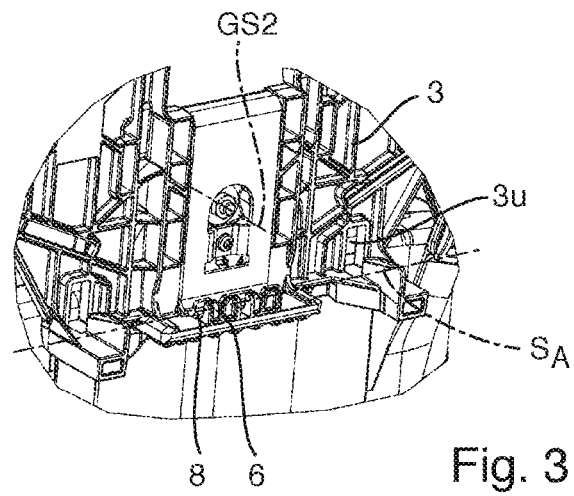
FIG. 3 shows a detail of a region III in FIG. 2.
Figure 4:
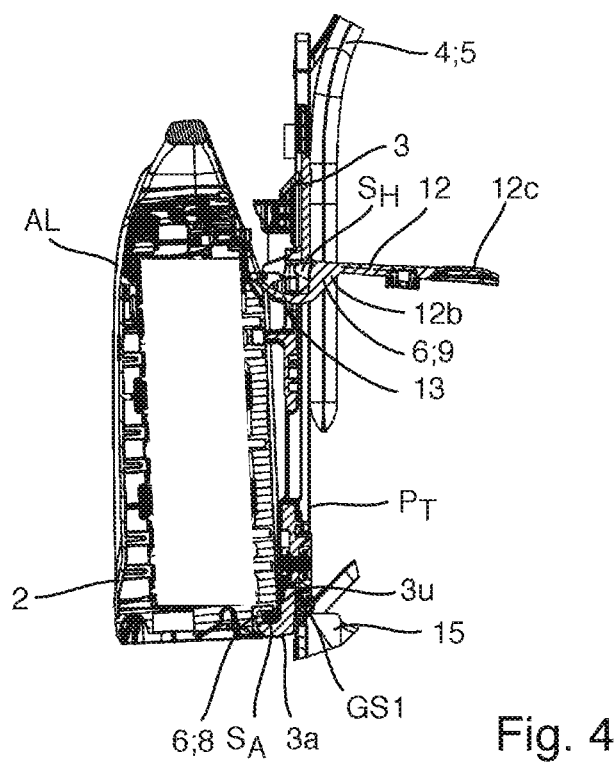
FIG. 4 shows a longitudinal sectional view of a harness with securing lever, and of a battery pack coupled in the docking position.

A harness illustrated in various views and embodiments in FIGS. 1 to 21 can be used on the back of a user in order to carry any desired objects that can be worn on the back. For this purpose, the harness has a support base 3 which serves to receive the object to be carried, e.g. by securing the object on the support base 3, or by introducing the object into a receiving space of the support base 3 in the same way as with a conventional backpack. In advantageous embodiments, the support base 3 has a plate-shaped structure, as shown. Alternatively, it can have any other desired structure of the kind known per se to a person skilled in the art for this functional component of harnesses of the type in question here, which does not require any further explanation here. Moreover, the harness comprises a support strap unit 4 for the support base 3. With the support strap unit 4, the user can wear the support base 3 on his back, with the object located on or in it.

In corresponding embodiments, the harness is designed as shown for carrying a battery pack 2, which in particular can be a battery pack that can be worn on the back and that supplies electrical energy to hand-held electrical tools, such as electrically powered gardening and/or forestry tools. For this purpose, the harness in such embodiments has a holding device 6 for releasably holding the battery pack 2 in a support position 7 on the support base 3.

Figure 5:
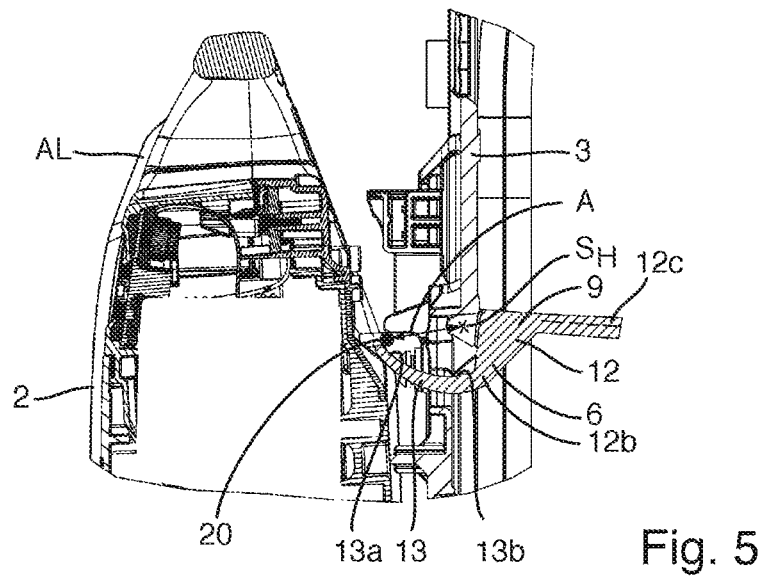
FIG. 5 shows a detail of an upper part of FIG. 4.
Figure 6:
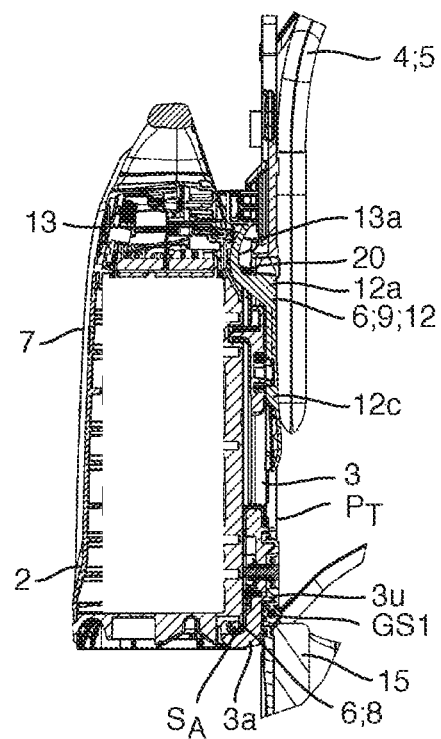
FIG. 6 shows the view from FIG. 4 with the battery pack in the support position.
Figure 7:
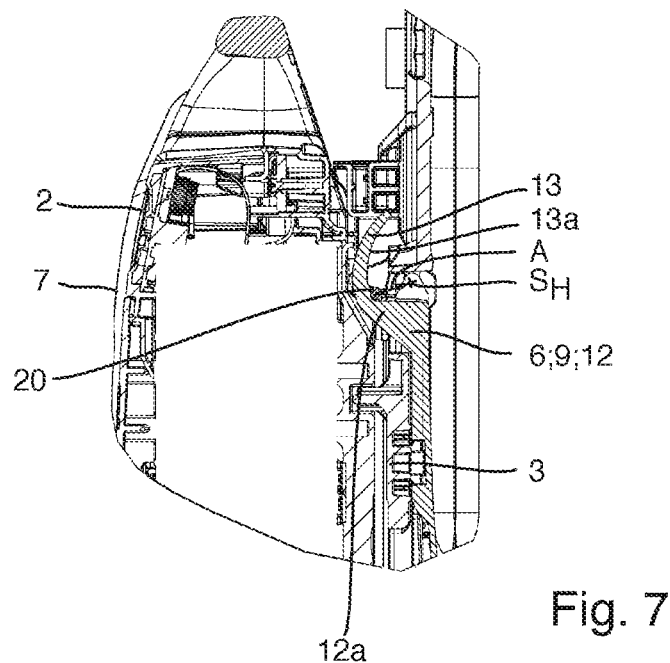
FIG. 7 shows the view from FIG. 5 with the battery pack in the support position.
Figure 8:
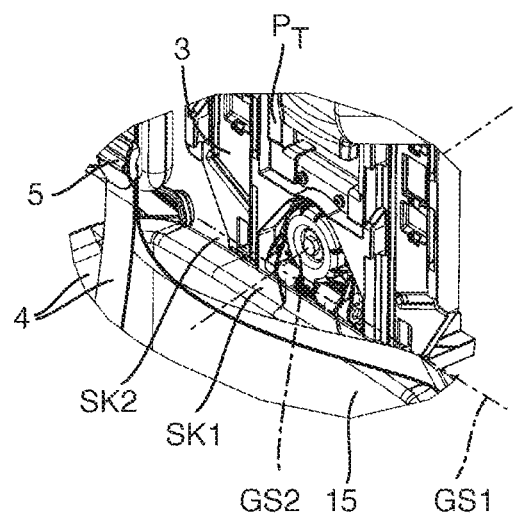
FIG. 8 shows a perspective detail of a connection region of a waist strap unit and of a shoulder strap unit of a harness.
Figure 9:
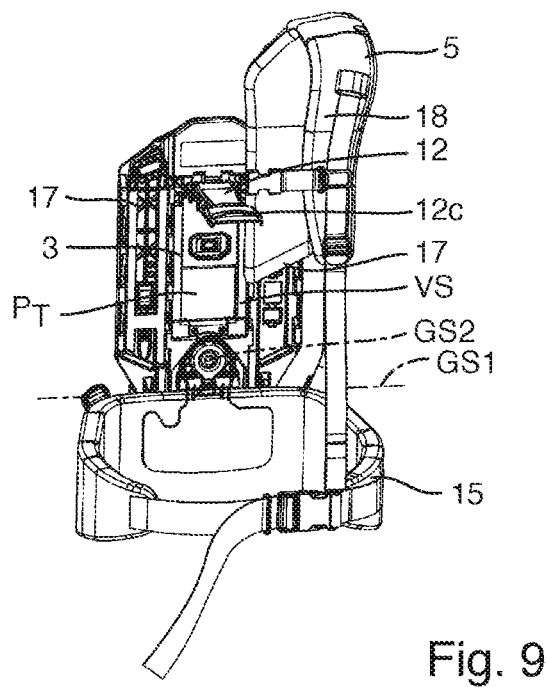
FIG. 9 shows a view corresponding to FIG. 1, with a strap web omitted.
Figure 10:
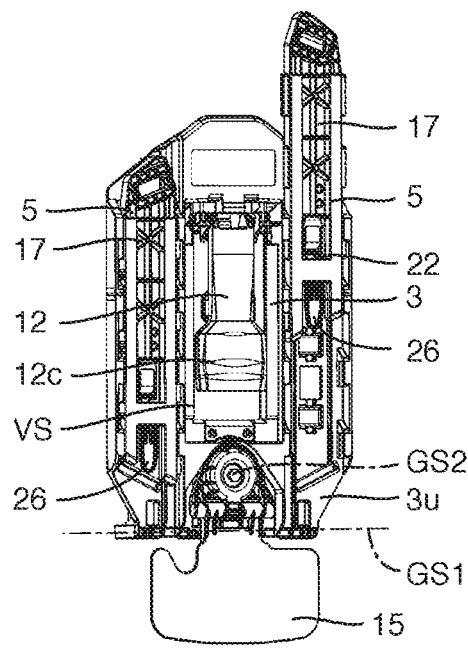
FIG. 10 shows a view corresponding to FIG. 9 with a strap web omitted and a waist strap unit partially omitted.
Figure 11:
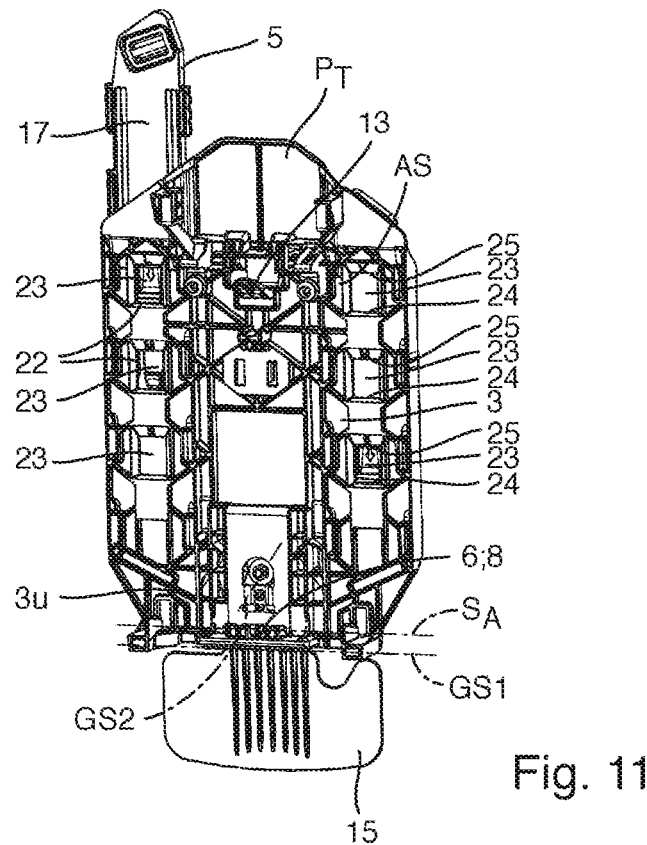
FIG. 11 shows the rear view of the harness from FIG. 10.
Figure 12:
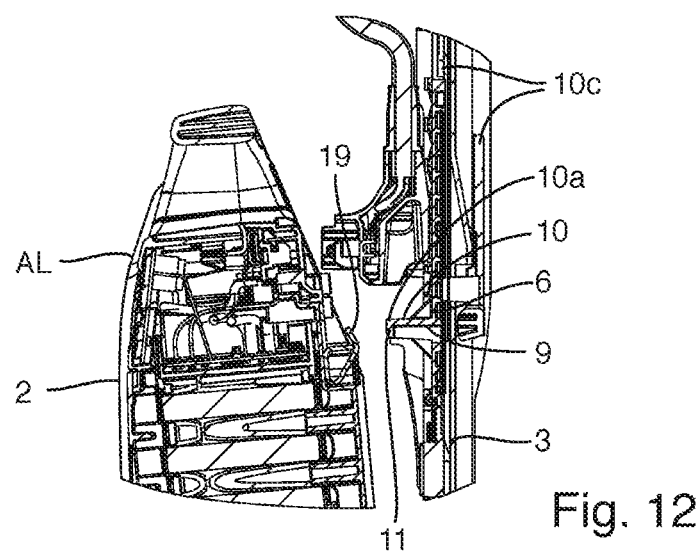
FIG. 12 shows a view corresponding to FIG. 5 for a harness with securing slide.
Figure 13:
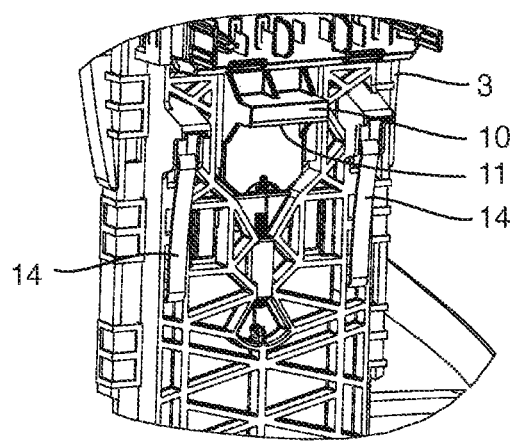
FIG. 13 shows a perspective rear view of a region of the harness from FIG. 12 comprising the securing slide.
Figure 14:
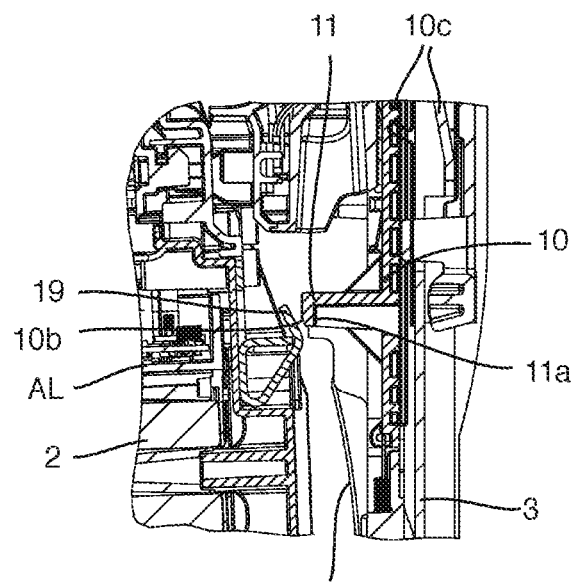
FIG. 14 shows a schematic sectional view of the region from FIG. 13 with the battery pack of FIG. 12 in the docking position.
Figure 15:
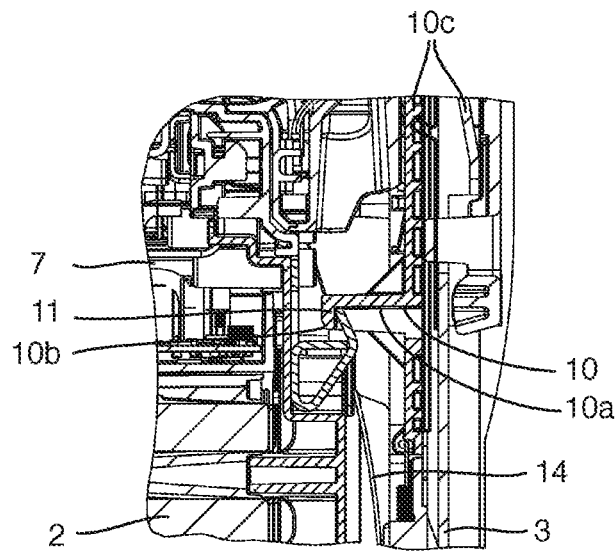
FIG. 15 shows the view from FIG. 14 with the battery pack in the support position.

The holding device 6 comprises a docking mechanism 8 on the support base 3 for pivotably docking the battery pack 2 in a docking position AL, as is shown for example in FIGS. 4, 5, 12 and 14, and a securing mechanism 9 on the support base 3 for securing the battery pack 2 in the support position 7 pivoted in towards the support base 3 with respect to the docking position AL, as is shown for example in FIGS. 6, 7 and 15. The docking mechanism 8 is arranged on a lower region 3u of the support base 3.

In corresponding embodiments, the docking mechanism 8 provides a pivot axis $S_A$ substantially parallel to an underside 3a of the support base 3 and serving for the pivoting movement of the battery pack 2 into the support position 7, as can be seen for example in FIGS. 3, 4, 6 and 11. In advantageous embodiments, this pivot axis $S_A$ is located directly on the underside 3a of the support base or at only a relatively short vertical distance above the latter.

In a corresponding embodiment, the securing mechanism 9 comprises a securing slide 10 which is arranged displaceably on the support base 3 between a release position and a securing position 10a and has a securing hook 11, which is designed to engage securely behind a corresponding mating securing element 19 of the battery pack 2 in the support position 7. Such an embodiment is illustrated in FIGS. 12 to 15. The release position, which is not explicitly shown, is located vertically above the indicated securing position 10a.

In corresponding embodiments, when the battery pack 2 is not docked, the securing slide 10 is located in the securing position 10a, and the securing slide 10 has a run-on bevel 10b which is designed, by interaction with the mating securing element 19 of the battery pack 2, to displace the securing slide 10 automatically in the direction of the release position during the inward pivoting of the docked battery pack 2 in the direction of the support position 7. Optionally, an elastic pretensioning element (not shown) is arranged on the support base 3 and pretensions the securing slide in the direction of its securing position 10a. During the inward pivoting of the battery pack 2 to its support position 7, the securing slide 10 is then displaced, counter to the action of the pretensioning element, from its securing position 10a to its release position, such that the battery pack 2 can be pivoted in fully to its support position 7, after which the pretensioning element automatically returns the securing slide 10 to its securing position 10a.

In corresponding embodiments, the securing hook 11 is configured, as in the example of FIGS. 12 to 15, extending obliquely with an inner face 11a, such that, in the manner of a safety catch, it safely holds the mating securing element 19 of the battery pack 2 against forces acting in the outward pivoting direction. In other words, this oblique catch inner face 11a of the securing hook 11 counteracts an inadvertent sliding of the battery pack 2 out of its support position 7.

In an alternative embodiment of the securing mechanism 9, the latter has a securing lever 12 which is arranged pivotably on the support base 3 between a release position 12b and a securing position 12a and has a securing bow 13, which is designed to engage securely behind a corresponding mating securing element 20 of the battery pack 2 in the support position 7. Such an embodiment of the securing mechanism 9 can be seen in FIGS. 1, 2, 4 to 7, 9 to 11 and 16 to 22.

In corresponding embodiments, the securing bow 13 has, as shown, a run-on face 13a extending in an arc shape with a non-constant spacing from a pivot axis $S_H$ of the securing lever. The mating securing element 20 of the battery pack 2 bears against the run-on face 13a of the securing bow 13 with a spacing A from the pivot axis $S_H$ of the securing lever 12, wherein this spacing A decreases with increasing pivoting of the securing lever 12 in the direction of the securing position 12a. In the illustrative embodiment of FIGS. 4 to 7, this spacing A decreases over the entire length of the run-on face 13a as far as its end point corresponding to the securing position of the securing lever. This spacing A is thus minimal in the support position 7 of the battery pack 2 or in the securing position 12a of the securing lever 12, as shown in FIG. 7, whereas it is considerably greater by contrast in the docking position AL of the battery pack 2, in which position the battery pack 2 is located when its mating securing element 20 reaches the region of the securing lever 12 or of the securing bow 13 thereof, as shown in FIG. 5. This represents an advantageous force profile characteristic for the force exerted on the battery pack 2 by the securing lever 12 during the inward pivoting from the docking position AL to the support position 7.

Optionally, as is shown for the illustrative embodiment of FIGS. 4 to 7, the securing lever 12 can be provided, at its securing-side end of the run-on face 13a, with a latching shoulder 13b or the like in order to additionally secure the battery pack 2 in the support position 7 against inadvertent outward pivoting.

In corresponding embodiments, the securing slide 10 or the securing lever 12 has a user-actuated control element 10c, 12c which is located on a side VS of the support base 3 directed away from a battery pack coupling side AS of the support base 3. The coupling side AS can in particular be a rear face of the support base 3 directed away from the back of the user, wherein the side VS of the support base 3 directed away from the coupling side AS is then a front face of the support base 3 directed towards the back of a user when wearing the harness. In this case, the securing slide 10 or the securing lever 12 can be moved by the user from the securing position 10a, 12a to the release position 12b via the control element 10c, 12c on the front face RS of the support base 3, in order to permit an outward pivoting of the battery pack 2 from its support position 7 to its docking position AL and then to permit removal of the battery pack 2 from the support base 3. In alternative embodiments, the securing slide 10 or the securing lever 12 can be moved by the user in some other way from the securing position 10a, 12a to the release position 12b.

In corresponding embodiments, the holding device 6 has a cushioning spring arrangement 14 which provides the battery pack 2, in the support position 7 thereof, with elastic cushioning having a resilience acting in the outward pivoting direction. By virtue of this cushioning spring arrangement 14, the battery pack 2 can therefore bear resiliently against the support base 3 when it is located in its support position 7, such that the cushioning spring arrangement 14 can absorb or reduce impacts from the battery pack 2 on the support base 3, and vice versa. Moreover, the cushioning spring arrangement 14 is suitable for holding the battery pack 2 free of play in its support position 7 on the support base 3. The cushioning spring arrangement 14 can, for example, comprise an arrangement of one or more leaf springs arranged on the support base 3, as can be seen in FIGS. 12 to 15. In alternative embodiments, the cushioning spring arrangement can, additionally or alternatively to leaf springs, comprise an arrangement of one or more rubber buffers arranged on the support base, in particular round rubber buffers.

In corresponding embodiments, the harness comprises the support base 3 and the support strap unit 4 in a configuration in which the support strap unit 4 has a shoulder strap unit 5, a waist strap unit 15 and a joint unit which connects the waist strap unit 15 to the support base 3 in an articulated manner. The joint unit comprises a double joint 16 by which the waist strap unit 15 is connected to the support base 3 so as to be pivotable about two pivot axes GS1, GS2, as can be seen in particular from FIGS. 1 and 8 to 10. The pivot axis GS1 runs substantially parallel to a plate plane $P_T$ of the support base 3, while the other pivot axis GS2 runs substantially perpendicularly with respect to this plate plane $P_T$ of the support base 3. By means of this double joint 16, the waist strap unit 15 can thus be pivoted, in each case to the desired extent, about the preferably horizontal pivot axis GS1 in the direction of the front face RS or rear face AS of the support base 3 and also about the likewise preferably horizontal pivot axis GS2 laterally with respect to the support base 3. Preferably, the joint unit or the double joint 16 is formed by an independent component which is secured on the one hand to the waist strap unit 15 and on the other hand to the support base 3, as in the illustrative embodiment shown.

In advantageous embodiments, the pivot axis GS1 runs substantially between and parallel to two mutually facing side edges SK1, SK2 of the waist strap unit 15 on the one hand and of the support base 3 on the other hand, as can be seen in particular from FIGS. 8 to 11, and the pivot axis GS2 runs, offset with respect to this pivot axis GS1, in the direction away from the waist strap unit 15, specifically offset in an upward direction in the illustrative embodiment shown. This results in the waist strap unit 15 having kinematics of motion with respect to the support base 3 that are optimal for corresponding uses. In corresponding embodiments, the support base 3 forms a rigid or flexurally stiff component, or it can alternatively be realized as a flexurally soft component.

In corresponding embodiments, the harness comprises the support base 3 and the support strap unit 4 in a configuration in which the support strap unit has at least one shoulder strap unit 5, which is releasably connectable to the support base 3. In these embodiments, the shoulder strap unit 5 comprises at least one flexurally stiff strap holder 17 which, by means of a latch mechanism 22, can be releasably locked at several different heights on the support base 3, and at least one flexible strap web 18 connectable to the strap holder 17. In this case, the strap holder 17 consequently constitutes a stiff, rigid structural part in relation to the flexible strap web 18. The illustrative embodiments shown comprise this type of shoulder strap unit 5, as can be seen from the corresponding figures. In corresponding configurations, the shoulder strap unit 5 has only one flexurally stiff strap holder on which, for example, two flexible strap webs to be worn by the user can be arranged, or the shoulder strap unit 5 comprises, as shown, two flexurally stiff strap holders 17, to each of which a flexible strap web 18 or a common strap web can be connected.

In advantageous embodiments, the latch mechanism 22 provides several latches 23 for the at least one strap holder 17 at different heights on the support base 3. The respective latch 23 comprises a latch release position 24 and, upwardly offset in relation to the latch release position, a latch holding position 25. The strap holder 17 is vertically displaceable on the support base 3 between the latch release position 24 and the latch holding position 25 of the selected latch 23. In the latch release position 24, the strap holder 17 can be attached at the desired height to the support base 3 or removed therefrom. In the latch holding position 25, the strap holder 17 is connected to the support base 3 in a locked manner and is thus secured against coming loose from the support base 3. The strap holder 17 can be released from the support base 3 only if it is first moved downwards from the latch holding position 25 to the latch release position 24. This has the advantage that the weight of the support base 3, which acts in a downward direction and therefore seeks to move the support base 3 downwards relative to the strap holder 17 held by the user over the rest of the shoulder strap unit 5, cannot cause inadvertent release of the strap holder 17 from the support base 3. Instead, the strap holder 17 is held securely in its latch holding position 25 by the weight of the support base 3, which also includes the weight of an object held on or received by the latter.

In advantageous embodiments, the latch mechanism 22 has a snap-in lock 26, which holds the at least one strap holder 17 locked in the respective latch holding position 25. In the configuration shown, the snap-in lock 26 is formed by a locking button which can be actuated by the user to unlock it. When the user wishes to release the locking of the strap holder 17 in its latch holding position 25 in order to bring the strap holder 17 from its latch holding position 25 to its latch release position 24, he presses the locking button.

In corresponding embodiments, the securing bow 13, as is shown for the illustrative embodiment in FIGS. 16 to 21, has a run-on face 13'a extending in an arc shape with a non-constant spacing from the pivot axis $S_H$ of the securing lever 12, against which run-on face 13'a the mating securing element 20 of the battery pack 2 can be placed, wherein the run-on face 13'a extends from a start point $P_A$, corresponding to the release position 12b of the securing lever 12 as shown for the illustrative embodiment in FIG. 5, as far as an end point $P_E$ corresponding to the securing position 12a of the securing lever 12, and a spacing A' of a run-on contact point $K_A$ of the run-on face 13'a with the mating securing element 20 decreases with increasing pivoting of the securing lever 12 in the direction of the securing position 12a from the start point $P_A$ until reaching an inflexion point $P_W$ of the run-on face 13'a. The run-on face 13'a is designed at the inflexion point $P_W$ to make available a reversal of a torque, which can be exerted on the securing lever 12 by the mating securing element 20, from a torque $D_L$ acting in the direction of the release position 12b to a torque $D_Z$ acting in the direction of the securing position 12a.

The spacing A' of the run-on contact point $K_A$ of the run-on face 13'a corresponds to the spacing A of the run-on face 13a from the pivot axis $S_H$ in the illustrative embodiment of FIGS. 4 to 7, wherein the spacing A', with increasing pivoting of the securing lever 12 in the direction of the securing position 12a, decreases only in an admission region until it reaches the inflexion point $P_W$. Directly after the inflexion point $P_W$, the spacing A' initially increases slightly, before it then decreases again until the securing lever 12 reaches the securing position 12a.

Figure 16:
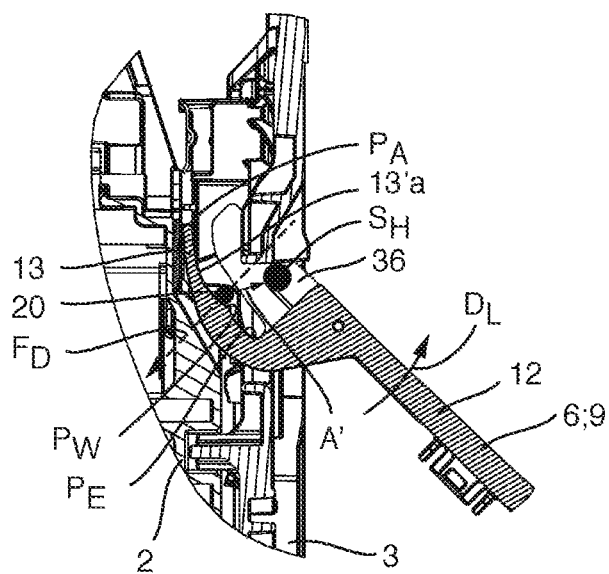
FIG. 16 shows a detailed sectional view of a harness similar to FIG. 5, having a modified securing lever with run-on face inflexion point and an outward pivoting aid in an inwardly pivoted position at the level of a run-on face inflexion point.
Figure 17:
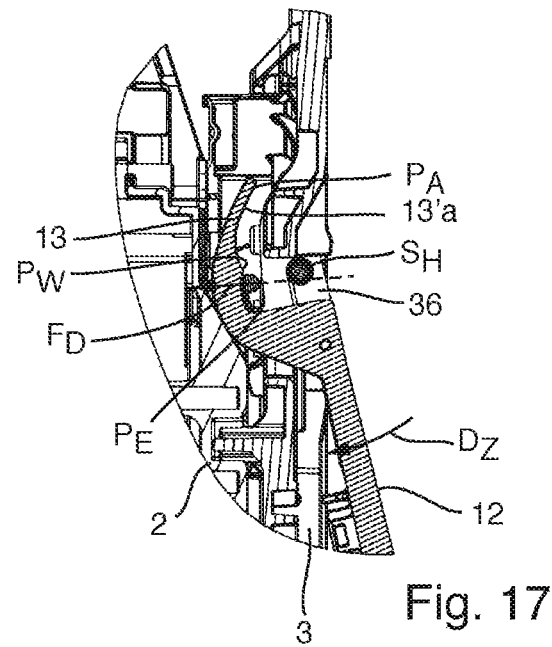
FIG. 17 shows the view from FIG. 16 with the securing lever in an inwardly pivoted position directly behind the inflexion point.
Figure 18:
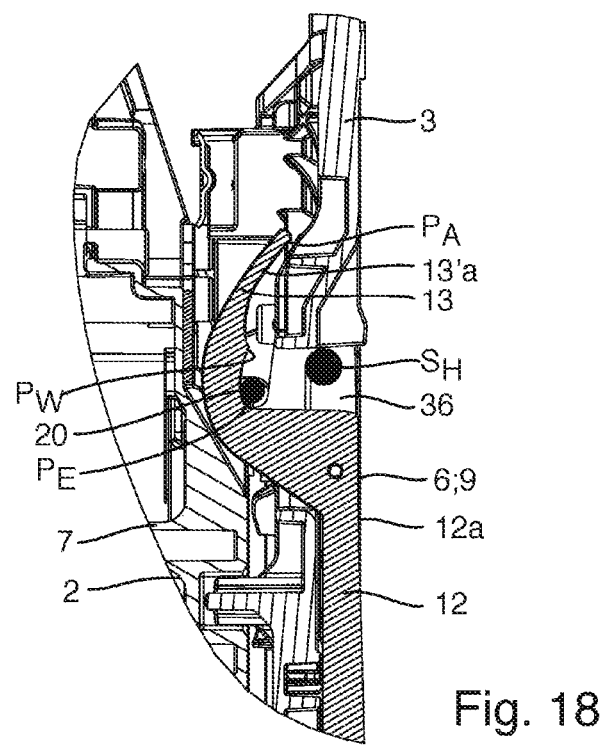
FIG. 18 shows the view from FIG. 16 with the securing lever in a securing position.

FIGS. 16 and 17 illustrate the stated torque reversal. In FIG. 16, the securing lever 12 is located in a position at which the run-on contact point $K_A$ of the run-on face 13'a, which migrates from the start point $P_A$ to the end point $P_E$ with increasing pivoting of the securing lever 12 in the direction of the securing position 12a, lies directly at or just before the inflexion point $P_W$. In this position of the securing lever 12, if the battery pack 2 is subjected to a force acting in the direction of the docking position AL, i.e. in the outward pivoting direction, whether by a user or by the weight of the battery pack 2, the mating securing element 20 exerts a force $F_D$ whose line of influence, shown by dashes in FIG. 16, runs on the side of the pivot axis $S_H$ directed towards the start point $P_A$ of the run-on face 13'a, at a spacing from the pivot axis $S_H$, such that the force $F_D$ in this case causes the torque $D_L$ acting in the direction of the release position 12b. In FIG. 17, the run-on contact point $K_A$ of the run-on face 13'a is located with the mating securing element 20 directly behind the inflexion point $P_W$, i.e. at the side of the inflexion point $P_W$ directed towards the end point $P_E$ of the run-on face 13'a. In this position, the force $F_D$, which the battery pack 2 loaded in the outward pivoting direction exerts with its mating securing element 20 on the securing lever 12 and specifically on the securing bow 13 of the latter, runs along a line of influence (again indicated by dashes) which now lies on the other side of the pivot axis $S_H$ directed away from the start point $P_A$ of the run-on face 13'a, at a spacing from the pivot axis $S_H$. This has the result that, in this case, the force $F_D$ applies to the securing lever 12 the torque $D_Z$ acting in the direction of the securing position 12a. This torque reversal is made available by the suitably selected contour of the run-on face 13'a in the region of the inflexion point $P_W$, which in the example shown comprises a change of contour of the run-on face 13'a from a decreasing sum of the spacing A' of the run-on contact point $K_A$ from the pivot axis $S_H$, with increasing pivoting of the securing lever 12 in the direction of the securing position 12a, to an increasing sum of this spacing A' at the inflexion point $P_W$.

The result of this torque reversal at the inflexion point $P_W$ is that, as long as the mating securing element 20 has not passed the inflexion point $P_W$ in the direction of the end point $P_E$, a force acting on the battery pack 2 in the outward pivoting direction, whether applied by a user or by the weight of the battery pack 2, has the effect that the securing lever 12 moves in the direction of the release position 12b, and the battery pack 2 thereby moves to its outwardly pivoted docking position AL, as shown in FIG. 5. As soon as the mating securing element 20 has passed the inflexion point $P_W$ in the direction of the end point $P_E$, the battery pack 2 with its mating securing element 20 presses the securing lever 12 in the direction of its securing position 12b under the effect of such a tensile force in the outward pivoting direction, such that the securing lever 12 with its securing bow 13 prevents the mating securing element 20 from passing the inflexion point $P_W$ in the direction of the start point $P_A$ of the run-on face 13'a. In other words, under the effect of such a tensile force in the outward pivoting direction, the battery pack 2 is prevented, by this inflexion point contour of the run-on face 13'a, from automatically pivoting out to the docking position AL beyond the outward pivoting position defined by the contact of its mating securing element 20 at the inflexion point $P_W$.

Figure 19:
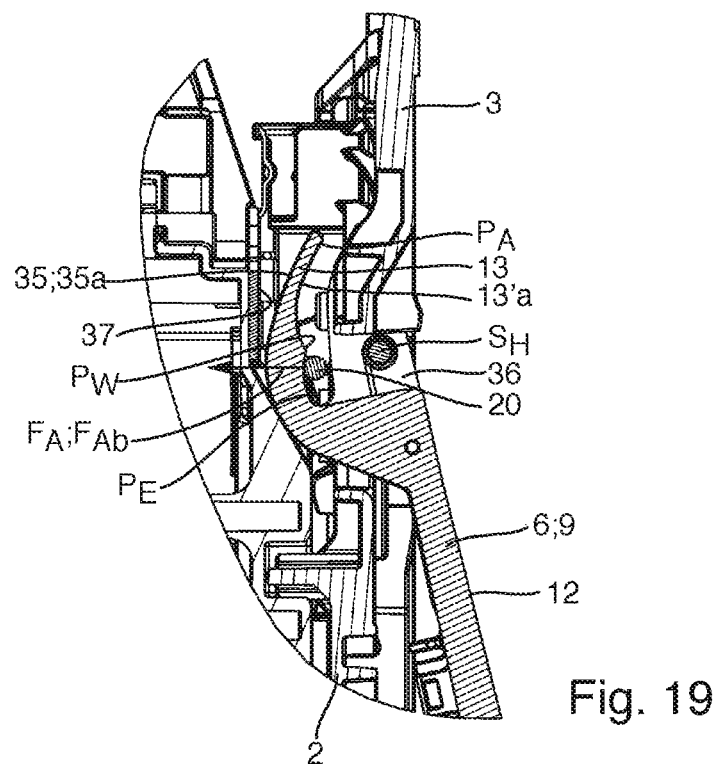
FIG. 19 shows the view from FIG. 16 with the securing lever in a first outwardly pivoted position.
Figure 20:
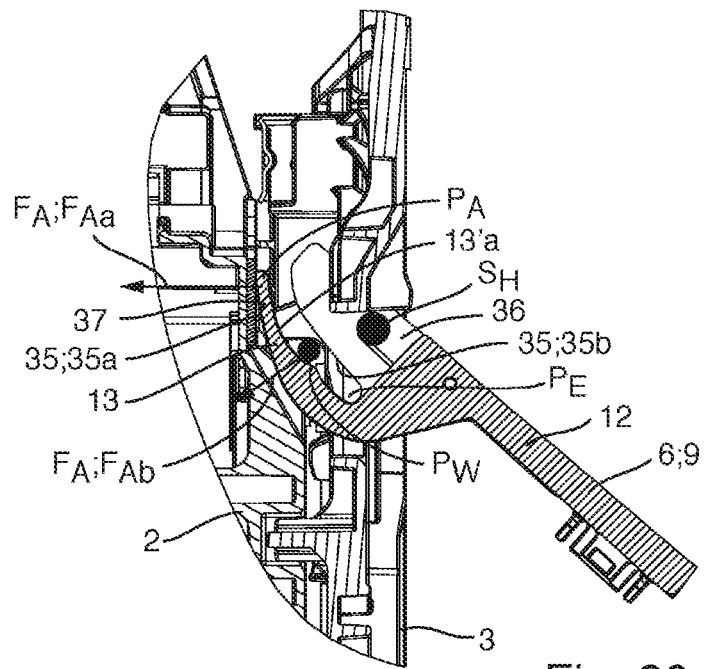
FIG. 20 shows the view from FIG. 16 with the securing lever in a second outwardly pivoted position.
Figure 21:
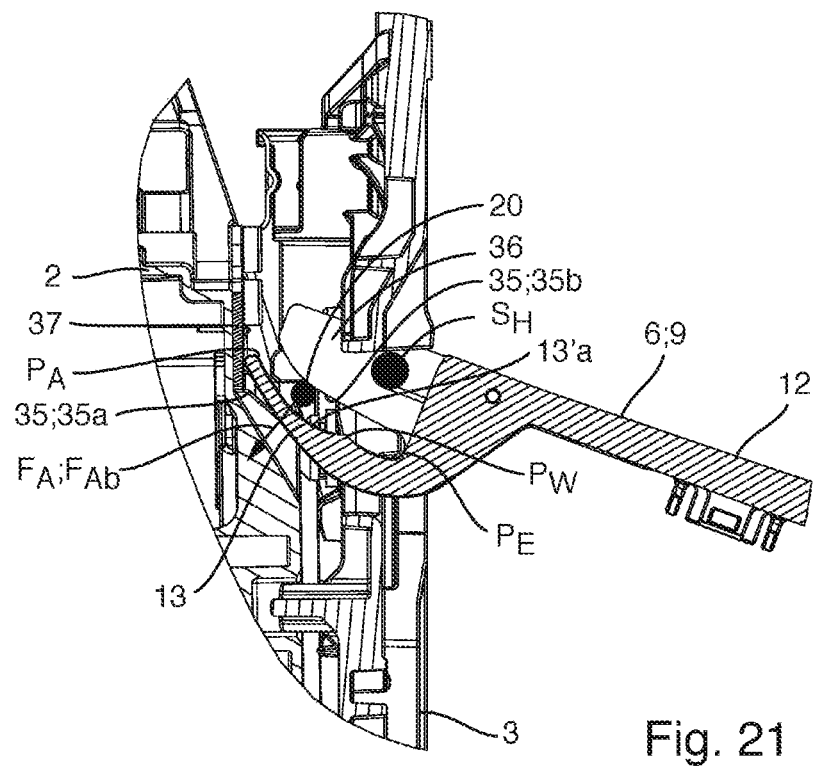
FIG. 21 shows the view from FIG. 16 with the securing lever in a third outwardly pivoted position.

In corresponding embodiments, the securing lever 12, as shown for the illustrative embodiment of FIGS. 16 to 21, has an ejector contour 35 which, during the pivoting of the securing lever 12 in the direction of the release position 12b, is designed to exert on the battery pack 2 an ejector force $F_A$ acting in the direction of the docking position AL. Through the provision of this ejector force $F_A$, the securing lever 12 is able, with its pivoting in the direction of the release position 12b, to assist the outward pivoting of the battery pack 2 from its support position 7 to its docking position AL. The ejector force $F_A$ can be used, for example, to overcome frictional forces between parts of the battery pack 2 and adjoining parts of the support base 3 and in any case to reduce an outward pivoting force that the user has to apply to the battery pack 2. FIGS. 19 to 21 illustrate the resulting ejection movement and outward pivoting movement from the support position 7 shown in FIG. 18.

In advantageous embodiments, the ejector contour 35 has an ejection pressure face 35a acting on a mating contact face 37 of the battery pack 2, on a side of the securing bow 13 directed away from the run-on face 13'a, as in the illustrative embodiment of FIGS. 16 to 21, and/or an ejection pressure face 35b acting on the mating securing element 20 of the battery pack 2, on a side of an ejector cam 36 of the securing lever 12 directed towards the run-on face 13'a, as is likewise shown for the illustrative embodiment of FIGS. 16 to 21. In alternative embodiments, the ejector contour 35 has only the ejection pressure face 35a or only the ejection pressure face 35b.

In the illustrative embodiment of FIGS. 16 to 21, the ejector cam 36 is designed in such a way that, upon the pivoting of the securing lever 12 to the release position 12b, it presses with its ejection pressure face 35b against the mating securing element 20 of the battery pack during the entire lever pivoting movement and thus, over the entire movement path of the pivoting lever 12 from its securing position 12a to its release position 12b, applies to the battery pack 2 an outward pivoting force $F_{Ab}$ acting in the direction of the docking position AL, as part of the ejector force $F_A$. To do so, the ejection pressure face 35b bears against the mating securing element 20 with a pressure contact point $K_D$ that migrates along it in the manner of the run-on contact point $K_A$ of the run-on face 13'a, wherein a spacing of this pressure contact point $K_D$ of the ejection pressure face 35b from the pivot axis $S_H$ increases with increasing pivoting of the securing lever 12 in the direction of the release position 12b.

In the outward pivoting movement illustrated in FIGS. 19 to 21, the contact between the mating securing element 20 of the battery pack 2 and the securing bow 13 of the securing lever 12 is cancelled, i.e. during the outward pivoting of the battery pack 2 there is no force between the mating securing element 20 on the one hand and the securing bow 13 on the other hand. In the illustrative embodiment shown, the run-on face 13'a of the securing bow 13 on the one hand and the ejection pressure face 35b of the ejector cam 36 on the other hand delimit a movement slit region with a slit width sufficiently greater than the diameter of the mating securing element 20, such that the mating securing element 20 can move in the desired manner inside this movement slit region when the securing lever 12 is pivoted in the direction of the securing position 12a or in the direction of the release position 12b.

In the example shown, the ejection pressure face 35a formed on the outside of the securing bow 13 interacts with the mating contact face 36 of the battery pack 2 only in a partial range of the whole pivoting movement of the securing lever 12 from its securing position 12a to its release position 12b. As is illustrated in FIGS. 19 to 21, in a first phase of the outward pivoting movement of the securing lever 12 from its securing position 12a, only the ejection pressure face 35b of the ejector cam 36 initially exerts its outward pivoting force $F_{Ab}$ on the mating securing element 20 and thus on the battery pack 2, while the ejection pressure face 35a of the securing bow 13 is still spaced apart from the mating contact face 37 of the battery pack 2. In a central phase of the pivoting movement of the securing lever 12 in the direction of its release position 12b, as illustrated in FIG. 20, the ejection pressure face 35a of the securing bow 13 then comes to bear against the mating contact face 37 of the battery pack 2 and subjects the battery pack 2 to an outward pivoting force $F_{Aa}$, as a further component of the overall ejector force $F_A$ of the securing lever 12. In a final phase of the pivoting movement of the securing lever 12 to its release position 12b, as illustrated in FIG. 21, the ejection pressure face 35a of the securing bow 13 has again moved away from the mating contact face 37 of the battery pack, such that in this pivoting movement phase, as in the first pivoting movement phase according to FIG. 19, only the ejection pressure face 35b of the ejector cam 36 contributes with its outward pivoting force $F_{Ab}$ to the ejector force $F_A$, i.e. forms the ejector force $F_A$.

Thus, depending on the system configuration and the case of use, the ejector force $F_A$ can be made available only from the ejection pressure face 35b of the ejector cam 36 or only from the ejection pressure face 35a of the securing bow 13 or from both ejection pressure faces 35a, 35b in common, depending on the pivoting position of the securing lever 12. For example, a common action of both ejection pressure faces 35a, 35b can be provided in pivoting positions of the securing lever 12 in which there is an increased need for an outward pivoting force or in which one of the two ejection pressure faces 35a, 35b on its own is unable to provide the ejector force $F_A$ at the desired strength. In alternative embodiments, only the ejection pressure face 35a or only the ejection pressure face 35b is present without the respective other ejection pressure face, and, in further alternative embodiments, the ejection pressure face 35a of the securing bow 13 acts during the entire pivoting movement of the securing lever 12 from its securing position 12a to its release position 12b, and, in yet further alternative embodiments, the ejection pressure face 35b of the ejector cam 36 acts on the mating securing element 20 of the battery pack 2 only in a partial range of the pivoting movement of the securing lever 12 from its securing position 12a to its release position 12b.

Figure 22:
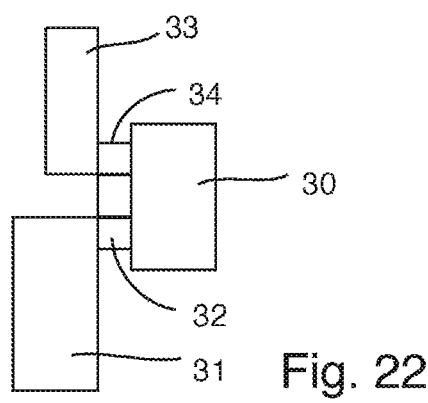
FIG. 22 shows a schematic block diagram of a tool kit with a harness, a battery pack and an electrical tool powered by the latter.

FIG. 22 is a block diagram illustrating a tool kit with a harness 1 and with a battery pack 2 that can be worn on the back and can be secured to the harness. Optionally, the tool kit additionally comprises a hand-held electrical tool 27 that can be supplied with electrical energy from the battery pack 2, for example an electrically powered gardening and/or forestry tool. The battery pack 2 can be mounted releasably on the harness 1 in the manner indicated. The electrical tool 27 can be coupled electrically to the battery pack 2 and/or the harness 1 by means of a flexible electrical lead or alternatively by a direct plug connection. Moreover, depending on the system configuration, the electrical tool 27 can be coupled mechanically rigidly to the battery pack 2 and/or the harness 1.

As is clear from the illustrative embodiments shown in the figures and discussed above, the invention makes available a harness with advantageous functional features as regards the coupling of a battery pack that can be worn on the back and, if necessary, also as regards strap height adjustment and/or binding of the waist strap unit to the support base. Although the harness is suitable in particular for carrying a battery pack, it is also suitable, depending on the embodiment, alternatively or additionally for carrying other objects that are mounted on the support base or that are received, for example, in a container or bag of the support base.

What is claimed is:

1. A harness, comprising:
  a support base;
  a support strap unit for the support base; and
  a holding device for releasably holding an object in a support position on the support base,
  wherein
  the holding device comprises a docking mechanism on the support base for pivotably docking the object in a docking position, and a securing mechanism on the support base for securing the object in the support position pivoted in towards the support base with respect to the docking position,
  the docking mechanism is arranged on a lower region of the support base, and
  the securing mechanism comprises:
    a securing lever which is arranged pivotably on the support base between a release position and a securing position and has a mechanically rigidly connected securing bow, which is designed to engage securely behind a corresponding mating securing element of the object in the support position.

2. The harness according to claim 1, wherein the docking mechanism comprises a pivot axis, substantially parallel to an underside of the support base, for the pivoting movement of the object into the support position.

3. The harness according to claim 1, wherein the securing bow comprises a run-on face extending in an arc shape with a non-constant spacing from a pivot axis of the securing lever, the mating securing element being configured to be placed against the run-on face with a spacing from the pivot axis, which spacing decreases with increasing pivoting of the securing lever in the direction of the securing position.

4. The harness according to claim 1, wherein the securing bow comprises a run-on face extending in an arc shape with a non-constant spacing from a pivot axis of the securing lever, the mating securing element being configured to be placed against the run-on face, wherein the run-on face extends from a start point as far as an end point corresponding to the securing position of the securing lever, and a spacing of a run-on contact point of the run-on face with the mating securing element from the pivot axis of the securing lever decreases with increasing pivoting of the securing lever in the direction of the securing position from the start point until reaching an inflexion point of the run-on face, and the run-on face is designed at the inflexion point to provide a reversal of a torque, which is exertable on the securing lever by the mating securing element, from a torque acting in the direction of the release position to a torque acting in the direction of the securing position.

5. The harness according to claim 1, wherein the securing lever comprises an ejector contour which, during the pivoting of the securing lever in the direction of the release position, is designed to exert on the object an ejector force acting in the direction of the docking position.

6. The harness according to claim 5, wherein the ejector contour comprises at least one of an ejection pressure face acting on a mating contact face of the battery pack, on a side of the securing bow directed away from the run-on face, and an ejection pressure face acting on the mating securing element of the object, on a side of an ejector cam of the securing lever directed towards the run-on face.

7. The harness according to claim 1, wherein the securing lever comprises a user-actuated control element which is located on a side of the support base directed away from an object coupling side of the support base.

8. The harness according to claim 1, wherein the holding device comprises a cushioning spring arrangement which provides the object, in the support position, with elastic cushioning having a resilience acting in the outward pivoting direction.

9. The harness according to claim 1, wherein the support strap unit comprises a shoulder strap unit, a waist strap unit and a joint unit which connects the waist strap unit to the support base in an articulated manner, wherein the joint unit comprises a double joint by which the waist strap unit is connected to the support base so as to be pivotable about two pivot axes, wherein one of the two pivot axes runs substantially parallel to a plate plane of the support base, and the other pivot axis runs substantially perpendicularly with respect to the plate plane of the support base.

10. The harness according to claim 9, wherein the joint unit is formed by an autonomous component which is fastened on the one hand to the waist strap unit and on the other hand to the support base.

11. The harness according to claim 9, further characterized in that one pivot axis runs substantially between and parallel to two mutually facing side edges of the waist strap unit and of the support base, and the other pivot axis runs, offset with respect to this pivot axis, in the direction away from the waist strap unit.

12. The harness according to claim 1, wherein the support strap unit comprises at least one shoulder strap unit, which is releasably connectable to the support base, and comprises at least one flexurally stiff strap holder which, by means of a latch mechanism, is configured to be releasably locked at several different heights on the support base, and at least one flexible strap web connected to the strap holder.

13. The harness according to claim 12, wherein the latch mechanism provides several latches for the at least one strap holder at different heights on the support base, wherein the respective latch comprises a latch release position and, upwardly offset in relation to the latch release position, a latch holding position, between which positions the strap holder is vertically displaceable on the support base.

14. The harness according to claim 12, wherein the latch mechanism comprises a releasable snap-in lock, which holds the at least one strap holder locked in the respective latch holding position.

15. The harness according to claim 1, wherein the object is a battery pack configured to be worn on the back and to supply electrical energy to hand-held electrical tools.

16. A tool kit, comprising:
  a harness; and a battery pack configured to be worn on the back and to be secured to the harness, said battery pack supplying electrical energy to hand-held electrical tools, wherein the harness comprises:

a support base;

a support strap unit for the support base; and a holding device for releasably holding an object in a support position on the support base, wherein the holding device comprises a docking mechanism on the support base for pivotably docking the object in a docking position, and a securing mechanism on the support base for securing the object in the support position pivoted in towards the support base with respect to the docking position, the docking mechanism is arranged on a lower region of the support base, and the securing mechanism comprises:

a securing lever which is arranged pivotably on the support base between a release position and a securing position and has a mechanically rigidly connected securing bow, which is designed to engage securely behind a corresponding mating securing element of the object in the support position.

17. The tool kit according to claim 16, further comprising:

a hand-held electrical tool configured to be supplied with electrical energy from the battery pack.

18. The tool kit according to claim 17, wherein the electrical tool is an electrically powered gardening tool or forestry tool.

19. A harness, comprising:

a support base;

a support strap unit for the support base; and a holding device for releasably holding an object in a support position on the support base, wherein the holding device comprises a docking mechanism on the support base for pivotably docking the object in a docking position, and a securing mechanism on the support base for securing the object in the support position pivoted in towards the support base with respect to the docking position, the docking mechanism is arranged on a lower region of the support base, and the securing mechanism comprises:

a securing slide which is arranged displaceably on the support base between a release position and a securing position and comprises a securing hook, which is designed to engage securely behind a corresponding mating securing element of the object in the support position, wherein, when the object is not docked, the securing slide is located in the securing position, and the securing slide has a run-on bevel which is designed, by interaction with the mating securing element, to displace the securing slide automatically in the direction of the release position when the docked object is pivoted inwards in the direction of the support position, and wherein the holding device comprises a cushioning spring arrangement which provides the object, in the support position, with elastic cushioning having a resilience acting in the outward pivoting direction.

20. The harness according to claim 19, wherein the docking mechanism comprises a pivot axis, substantially parallel to an underside of the support base, for the pivoting movement of the object into the support position.

21. The harness according to claim 19, wherein the securing slide comprises a user-actuated control element which is located on a side of the support base directed away from an object coupling side of the support base.

22. The harness according to claim 19, wherein the object is a battery pack configured to be worn on the back and to supply electrical energy to hand-held electrical tools.

23. A harness, comprising:

a support base;

a support strap unit for the support base; and a holding device for releasably holding an object in a support position on the support base, wherein the holding device comprises a docking mechanism on the support base for pivotably docking the object in a docking position, and a securing mechanism on the support base for securing the object in the support position pivoted in towards the support base with respect to the docking position, the docking mechanism is arranged on a lower region of the support base, and the securing mechanism comprises:

a securing slide which is arranged displaceably on the support base between a release position and a securing position and comprises a securing hook, which is designed to engage securely behind a corresponding mating securing element of the object in the support position, wherein, when the object is not docked, the securing slide is located in the securing position, and the securing slide has a run-on bevel which is designed, by interaction with the mating securing element, to displace the securing slide automatically in the direction of the release position when the docked object is pivoted inwards in the direction of the support position, and wherein the support strap unit comprises a shoulder strap unit, a waist strap unit and a joint unit which connects the waist strap unit to the support base in an articulated manner, wherein the joint unit comprises a double joint by which the waist strap unit is connected to the support base so as to be pivotable about two pivot axes, wherein one of the two pivot axes runs substantially parallel to a plate plane of the support base, and the other pivot axis runs substantially perpendicularly with respect to the plate plane of the support base.

24. The harness according to claim 23, wherein the docking mechanism comprises a pivot axis, substantially parallel to an underside of the support base, for the pivoting movement of the object into the support position.

25. The harness according to claim 23, wherein the securing slide comprises a user-actuated control element which is located on a side of the support base directed away from an object coupling side of the support base.

26. The harness according to claim 23, wherein the object is a battery pack configured to be worn on the back and to supply electrical energy to hand-held electrical tools.

27. The harness according to claim 23, wherein the joint unit is formed by an autonomous component which is fastened on the one hand to the waist strap unit and on the other hand to the support base.

28. A harness, comprising:

a support base;

a support strap unit for the support base; and a holding device for releasably holding an object in a support position on the support base, wherein the holding device comprises a docking mechanism on the support base for pivotably docking the object in a docking position, and a securing mechanism on the support base for securing the object in the support position pivoted in towards the support base with respect to the docking position, the docking mechanism is arranged on a lower region of the support base, and the securing mechanism comprises:

a securing slide which is arranged displaceably on the support base between a release position and a securing position and comprises a securing hook, which is designed to engage securely behind a corresponding mating securing element of the object in the support position, wherein, when the object is not docked, the securing slide is located in the securing position, and the securing slide has a run-on bevel which is designed, by interaction with the mating securing element, to displace the securing slide automatically in the direction of the release position when the docked object is pivoted inwards in the direction of the support position, and wherein the support strap unit comprises at least one shoulder strap unit, which is releasably connectable to the support base, and comprises at least one flexurally stiff strap holder which, by means of a latch mechanism, is configured to be releasably locked at several different heights on the support base, and at least one flexible strap web connected to the strap holder.

29. The harness according to claim 28, wherein the docking mechanism comprises a pivot axis, substantially parallel to an underside of the support base, for the pivoting movement of the object into the support position.

30. The harness according to claim 28, wherein the securing slide comprises a user-actuated control element which is located on a side of the support base directed away from an object coupling side of the support base.

31. The harness according to claim 28, wherein the object is a battery pack configured to be worn on the back and to supply electrical energy to hand-held electrical tools.

* * * * *